United States Patent
Skurnik et al.

(10) Patent No.: US 8,716,649 B2
(45) Date of Patent: May 6, 2014

(54) OPTICAL GESTURE SENSOR USING A SINGLE ILLUMINATION SOURCE

(75) Inventors: David Skurnik, Kirkland, WA (US); Nevzat Akin Kestelli, San Jose, CA (US); Ilya K. Veygman, Menlo Park, CA (US); Anand Chamakura, San Jose, CA (US); Christopher Francis Edwards, Sunnyvale, CA (US); Nicole Kerness, Menlo Park, CA (US); Pirooz Parvarandeh, Los Altos Hills, CA (US); Sunny Kweisun Hsu, Los Altos, CA (US)

(73) Assignee: Maxim Integrated Products, Inc., San Jose, CA (US)

(*) Notice: Subject to any disclaimer, the term of this patent is extended or adjusted under 35 U.S.C. 154(b) by 300 days.

(21) Appl. No.: 13/304,603

(22) Filed: Nov. 25, 2011

(65) Prior Publication Data

US 2012/0280107 A1   Nov. 8, 2012

Related U.S. Application Data

(60) Provisional application No. 61/483,034, filed on May 5, 2011.

(51) Int. Cl.
   *G06M 7/00*   (2006.01)
   *H01J 40/14*   (2006.01)
   *H01L 31/0203*   (2014.01)

(52) U.S. Cl.
   USPC .......................... 250/221; 250/239; 257/433

(58) Field of Classification Search
   USPC ................ 250/204, 205, 552, 553, 216, 221, 250/208.1, 239, 398, 400; 257/294, 431, 257/432, 433, 435; 348/135–137, 152–155, 348/352; 396/120, 153, 155, 590; 362/543, 362/544, 546
   See application file for complete search history.

(56) References Cited

U.S. PATENT DOCUMENTS

| | | | |
|---|---|---|---|
| 6,618,038 B1* | 9/2003 | Bohn | 345/164 |
| 6,724,490 B2 | 4/2004 | Ono | |
| 7,919,798 B2* | 4/2011 | Lee | 257/294 |
| 8,187,097 B1 | 5/2012 | Zhang | |
| 2007/0146318 A1 | 6/2007 | Juh | |
| 2008/0006762 A1 | 1/2008 | Fadell | |
| 2010/0102230 A1 | 4/2010 | Chang | |
| 2010/0255600 A1 | 10/2010 | Farr | |
| 2012/0074301 A1 | 3/2012 | Kroese | |

* cited by examiner

*Primary Examiner* — Georgia Y Epps
*Assistant Examiner* — Don Williams
(74) *Attorney, Agent, or Firm* — Advent, LLP (57) ABSTRACT

A gesture sensing device includes a single light source and a multiple segmented single photo sensor, or an array of photo sensors, collectively referred to herein as segmented photo sensors. A light modifying structure relays reflected light from the light source onto different segments of the segmented photo sensors. The light modifying structure can be an optical lens structure or a mechanical structure. The different segments of the photo sensor sense reflected light and output corresponding sensed voltage signals. A control circuit receives and processes the sensed voltage signals to determine target motion relative to the segmented photo sensor.

13 Claims, 12 Drawing Sheets

A-B is Left Right

Fig. 7

C-D is Up Down

OPTICAL GESTURE SENSOR USING A SINGLE ILLUMINATION SOURCE

RELATED APPLICATIONS

This application claims priority of U.S. provisional application Ser. No. 61/483,034, filed May 5, 2011, and entitled "Gesture Sensing Method and Apparatus", by these same inventors. This application incorporates U.S. provisional application Ser. No. 61/483,034 in its entirety by reference.

FIELD OF THE INVENTION

This invention relates to displays for electronic devices. More specifically, this invention relates to a device that senses and determines physical gestures.

BACKGROUND OF THE INVENTION

A gesture sensor is a human interface device that enables the detection of physical movement without the user actually touching the device within which the gesture sensor resides. The detected movements can be subsequently used as input commands for the device. In some applications, the device is programmed to recognize distinct non-contact hand motions, such as left to right, right to left, up to down, down to up, in to out, and out to in hand motions. Gesture sensors have found popular use in handheld devices, such as tablet computing devices and smartphones, and other portable devices, such as laptops. Gesture sensors are also being implemented in video game consoles that detect the motion of a video game player.

Figure 1:
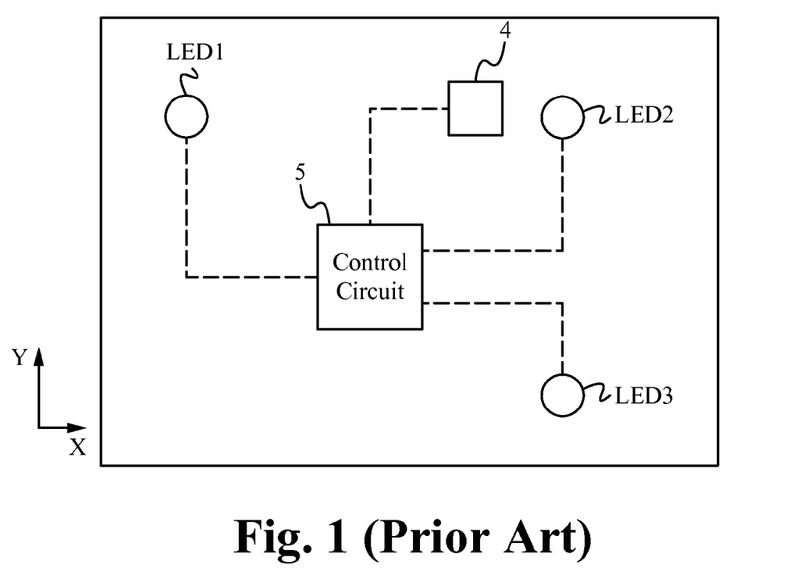
FIG. 1 illustrates a simplified block diagram of a conventional gesture sensor.
Figure 2:
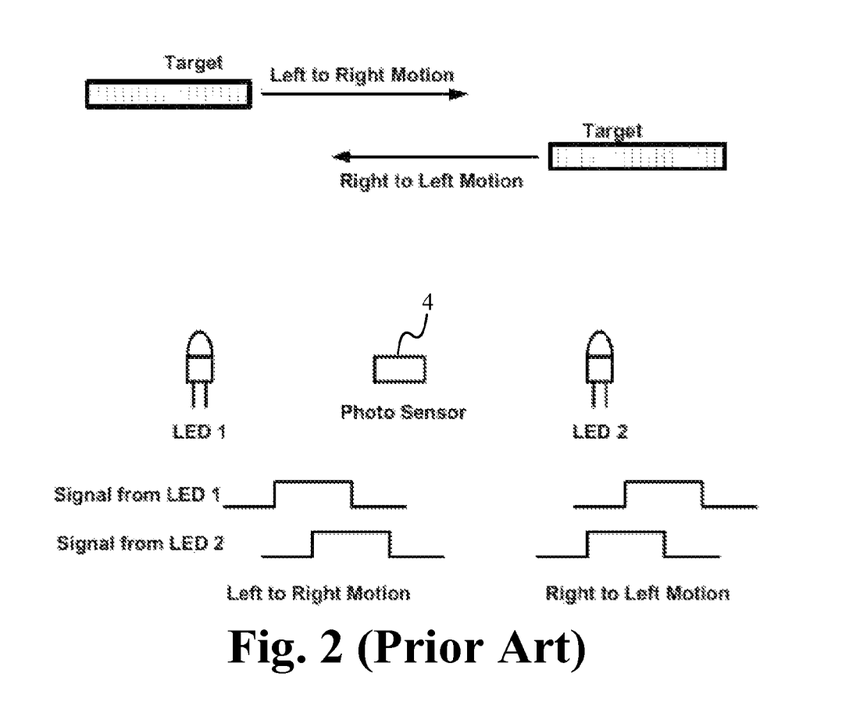
FIG. 2 illustrates an exemplary method for detecting a moving target using the gesture sensor of FIG. 1.

Most conventional gesture sensor implementations use three or more illumination sources, such as light emitting diodes (LEDs), and a light sensor, such as a photo detector. The illumination sources are turned on and off, or flashed, in succession in order for the sensor to obtain spatial information from reflection of the flashed light. FIG. 1 illustrates a simplified block diagram of a conventional gesture sensor. A photo sensor 4 is positioned proximate LED 1, LED 2, and LED 3. A control circuit 5 is programmed to successively turn on and off the LEDs 1-3 and analyze the resulting measurements sensed by the photo sensor 4. FIG. 2 illustrates an exemplary method for detecting a moving target using the gesture sensor of FIG. 1. The motion is detected by observing the relative delay between sensed signals from the same-axis LEDs. For example, to detect left to right or right to left motion, the signals sensed by the LEDs 1 and 2 are compared, as shown in FIG. 2. LED 1 is flashed at a different time than LED 2. The LEDs 1 and 2 are positioned in known locations and are turned on and off in a known sequence. When the light from the LEDs strikes a target moving above the LEDs, light is reflected off the moving target back to the photo sensor 4. The sensed reflected light is converted to a voltage signal which is sent to the control circuit 5. The control circuit 5 includes an algorithm that uses the LED positions, the LED firing sequences, and the received sensed data to determine relative movement of the target.

FIG. 2 shows the sensed voltage signals for the case of left to right motion. A sensed voltage signal is a voltage versus time curve. The curve labeled "Signal from LED 1" shows the sensed voltage resulting from repeated flashes of the LED 1. The low portion of the curve indicates the target is not passing over, or near, the LED 1. In other words, the target is not within the "field of view" of the photo sensor 4 whereby light emitted from the LED 1 can be reflected off the target and onto the photo sensor 4. If the target is not within the field of view of the photo sensor 4 as related to the LED 1, the photo sensor 4 does not sense any reflections of light emitted from LED 1. The high portion of the curve indicates the target is passing over, or near, the LED 1. The curve labeled "Signal from LED 2" shows the sensed voltage resulting from repeated flashes of the LED 2. While LED 1 is on, LED 2 is off, and vice versa. While the target is positioned over, or near, LED 1, the sensed voltage related to flashing of LED 1 is high, but the sensed voltage related to flashing of the LED 2 is low. While the target is positioned in the middle, between the two LEDs 1 and 2, the photo sensor 4 detects reflected light from flashing of both LED 1 and LED 2. While the target is positioned over, or near, LED 2, the sensed voltage related to flashing of LED 2 is high, but the sensed voltage related to flashing of the LED 1 is low. When the target is not positioned over either LED 1 or LED 2 or between LED 1 and LED 2, the photo sensor 4 does not sense reflected light associated with either and the corresponding sensed voltage levels are low.

For left to right motion, the sensed voltage level for "signal from LED 1" goes high before the sensed voltage level for "signal from LED 2", as shown in FIG. 2. In other words, the voltage versus time curve of "signal from LED 2" is delayed relative to the voltage versus time curve of "signal from LED 1" when the target is moving from left to right.

FIG. 2 also shows the sensed voltage signals for the case of right to left motion. For right to left motion, the sensed voltage level for "signal from LED 2" goes high before the sensed voltage level for "signal from LED 1", as shown in the two voltage versus time curves on the left hand side of FIG. 2. In other words, the voltage versus time curve of "signal from LED 1" is delayed relative to the voltage versus time curve of "signal from LED 2" when the target is moving from right to left.

Up and down motion, where up and down are considered to be motion in the y-axis, is similarly determined using LEDs 2 and 3 and the corresponding voltage versus time data. The control circuit 5 receives the sensed voltage from the photo sensor 4 and determines relative target motion in the y-axis in a similar manner as that described above in relation to the x-axis.

A disadvantage of the multiple illumination source configuration is the multiple number of illumination source components that must be integrated within the device. With ever decreasing device size, additional components are undesirable.

SUMMARY OF THE INVENTION

A gesture sensing device includes a single light source and a multiple segmented single photo sensor, or an array of photo sensors, collectively referred to herein as segmented photo sensors. A light modifying structure relays reflected light from the light source onto different segments of the segmented photo sensors. The light modifying structure can be an optical lens structure or a mechanical structure. The different segments of the photo sensor sense reflected light and output corresponding sensed voltage signals. A control circuit receives and processes the sensed voltage signals to determine target motion relative to the segmented photo sensor.

In an aspect, a device to determine a physical gesture is disclosed. The device includes a single illumination source; a plurality of light sensors; a light modifying structure to relay reflected light to the plurality of light sensors, wherein the reflected light is light from the single illumination source reflected off a target object; and a processing circuit coupled to the plurality of light sensors to analyze time dependent signals received from the plurality of light sensors and to determine target object directional movement proximate to the device.

The illumination source can be a light emitting diode. Each light sensor can be a photodiode. The plurality of light sensors can be an array of individual light sensors or a single light sensor partitioned into multiple segments. In some embodiments, the light modifying structure is an optical lens structure. In other embodiments, the light modifying structure is a mechanical structure configured to selectively block a portion of the light depending on a position of the target object relative to the plurality of light sensors. In the case of a mechanical structure, each light sensor can be formed as a plurality of cell structures, each cell structure having two photodiodes, further wherein the mechanical structure can include a plurality of wall structures, one wall structure per cell wherein the wall structure is positioned between the two photo diodes. In some embodiments, a top layer of each wall structure has an outer perimeter that does not overlap either of the two photodiodes. In other embodiments, a top layer of each wall structure has an outer perimeter that partially covers each of the two photodiodes. Each wall structure can include a plurality of metal layers and a plurality of dielectric layers, a dielectric layer separating each metal layer, wherein each dielectric layer includes a plurality of metal through vias that couple to metal layers on either side of the dielectric layer. In some embodiments, the plurality of wall structures are fabricated using semiconductor manufacturing processes.

In some embodiments, each wall structure is perpendicular to a top surface of the one or more photodiodes. In other embodiments, each light sensor includes a plurality of cell structures, each cell structure including one or more photodiodes, further wherein the mechanical structure includes a plurality of wall structures, one wall structure per cell wherein the wall structure is at a non-perpendicular angle to a top surface of the one or more photodiodes. In this non-perpendicular configuration, each wall structure can include a plurality of metal layers and a plurality of through vias configured in a stair-step structure.

In some embodiments, each light sensor includes a plurality of cell structures, each cell structure including two photodiodes, further wherein the mechanical structure includes a plurality of slotted metal layers, one slotted metal layer per cell wherein the slotted metal layer is positioned above the two photo diodes and an open slot of the slotted metal layer is aligned with a center point between the two photodiodes. Each cell can also include a dielectric layer positioned between the photodiodes and the slotted metal layer, wherein the dielectric layer is optically transparent. In other embodiments, the plurality of light sensors are formed on an integrated circuit chip, and each light sensor is a photodiode, further wherein the mechanical structure includes a chip package coupled to the integrated circuit chip, the chip package including a wall structure positioned between each of the photodiodes.

DETAILED DESCRIPTION OF THE EMBODIMENTS

Embodiments of the present application are directed to a gesture sensing device. Those of ordinary skill in the art will realize that the following detailed description of the gesture sensing device is illustrative only and is not intended to be in any way limiting. Other embodiments of the gesture sensing device will readily suggest themselves to such skilled persons having the benefit of this disclosure.

Reference will now be made in detail to implementations of the gesture sensing device as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions will likely be made in order to achieve the developer's specific goals, such as compliance with application and business related constraints, and that these specific goals can vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Embodiments of a gesture sensing device include a single light source and a multiple segmented single photo sensor, or an array of photo sensors. By adding a light modifying structure, such as an optical lens structure or a mechanical structure, the reflected light can be focused and/or directed onto different segments of the photo sensor. The different segments of the photo sensor sense reflected light at the same time, and the relative amplitude from each segment is indicative of movement of the target. A control circuit receives and processes the sensed data from the segmented photo sensor to determine target motion relative to the segmented photo sensor. The one light sensor configuration is more compact and less expensive than multiple source configurations. Another advantage of the gesture sensing device is that a user can convey a device command through gesturing without the need to activate a touch screen controller, or use of mechanical buttons. This provides significant power and cost savings.

Figure 3:
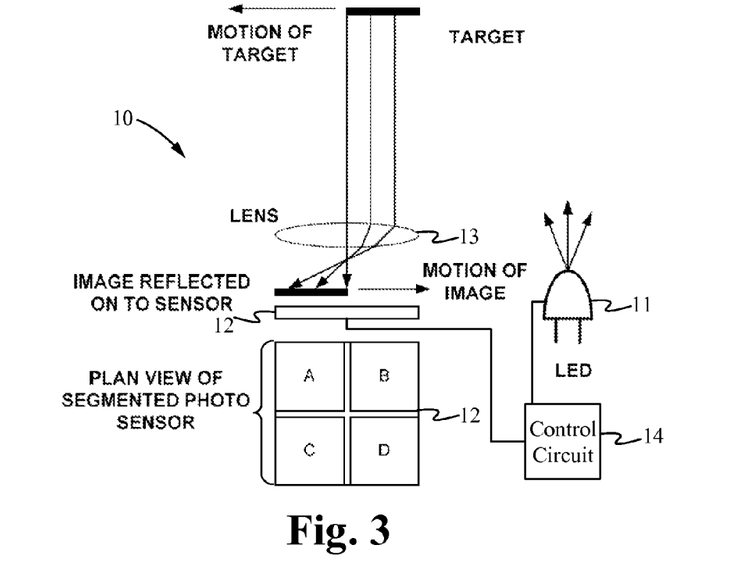
FIG. 3 illustrates a conceptual diagram of the gesture sensing device according to an embodiment.

FIG. 3 illustrates a conceptual diagram of the gesture sensing device according to an embodiment. The gesture sensing device 10 includes a single illumination source, represented as LED 11, and a segmented photo sensor 12. In some embodiments, the segmented photo sensor 12 is configured to sense only a specific wavelength or wavelengths of light, such as the wavelengths emitted by the illumination source 11. Such a configuration can be implemented through the use of a filter. The segmented photo sensor 12 can be either a single sensor functionally partitioned into multiple segments or an array of individual photo sensors. For example, a quad segmented photo sensor is functionally equivalent to four individual photo sensors arranged in a quad layout. As used herein, reference to a "segment" refers to either a partitioned segment within a single sensor or to an individual sensor in an array of sensors. FIG. 3 shows the segmented photo sensor 12 as both on-edge (upper element labeled 12) and a plan view to show the different segments (lower element labeled 12).

In the exemplary configuration of FIG. 3, the segmented photo sensor 12 includes four segments, segment A, segment B, segment C, and segment D. Although a four segment detector is the simplest implementation, it is understood that the number of segments can be increased to increase the resolution of the system. The signal processing electronics become increasingly more complex as the number of segments is increased. Each of the segments is isolated from each other. The LED 11 is positioned proximate to the segmented photo sensor 12. When a moving target passes proximate to the LED 11 and the segmented photo sensor 12, light output from the LED 11 is reflected off the moving target and to the segmented photo sensor 12. The gesture sensing device 10 also includes an optical lens structure 13 to focus light onto the segmented photo sensor 12. The focusing lens focuses reflected light from a moving target, such as a hand gesture, in the space above the segmented photo sensor 12. It is understood that only reflected light that is within the "field of view" of the optical lens structure 13 is focused onto the segmented photo sensor 12. Although shown as a single element 13 in FIG. 3, the optical lens structure 13 represents any number of lens and/or optical elements for directing light to the segmented photo sensor 12. An exemplary implementation of an optical lens structure and/or light sensor is described in the co-owned and co-pending U.S. Provisional Patent Application Ser. No. 61/490,568, filed May 26, 2011, and entitled "Light Sensor Having Glass Substrate With Lens Formed Therein" and the co-owned and co-pending U.S. Provisional Patent Application Ser. No. 61/491,805, filed May 31, 2011, and entitled "Light Sensor Having Glass Substrate With Lens Formed Therein", which are both incorporated in their entireties by reference. Each segment of the segmented photo sensor 12 outputs a segment signal to a control circuit 14, where the segment signals are processed.

The LED 11 is continuously or periodically energized to illuminate the target. The light reflected from the target induces the segment signal on each of the segmented photo sensors. These segment signals are processed and stored in a buffer memory, the buffer memory being integrated with or separate from the control circuit 14. The control circuit 14 analyzes the stored data and determines if a valid gesture has been detected. The same data can be also be used so that the segmented photo sensor 12 operates as a proximity detector. The same photo sensor structure can be used with a different signal processing circuit so that the gesture sensing device also functions as an ambient light sensor.

When the LED 11 is powered on, or flashes, the target is illuminated if the target is within a proximate space above the segmented photo sensor 12. The moving target is conceptually illustrated in FIG. 3 as a flat reflector. The target reflection is imaged by the optical lens structure 13 onto the segmented photo sensor 12. The example of FIG. 3 illustrates a right to left motion of the target. As the edge of the target moves through the center of the imaging zone, the focused image of the target edge moves across the segmented photo sensor 12. The segments A and C respond first to the moving image, followed by segments B and D. The control circuit 14 is programmed to detect this sequence of events, and recognizes a right to left target motion. Similarly, a left to right target motion can be recognized by the opposite sequence, and both up to down and down to up target motions can be recognized using the orthogonal set of signals. The in and out target motion can be recognized by sensing the absolute amplitude of the sum of the four segments A-D, which is also the proximity measurement.

Figure 4:
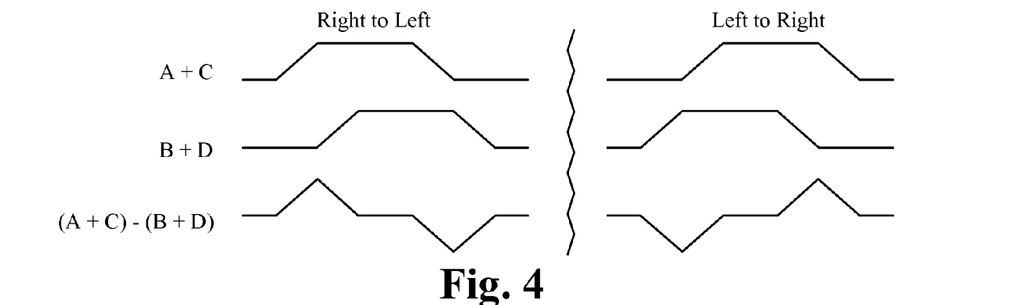
FIGS. 4 and 5 illustrate exemplary composite signals generated from signals output from the segmented photo sensor in response to a target moving in various directions.
Figure 5:
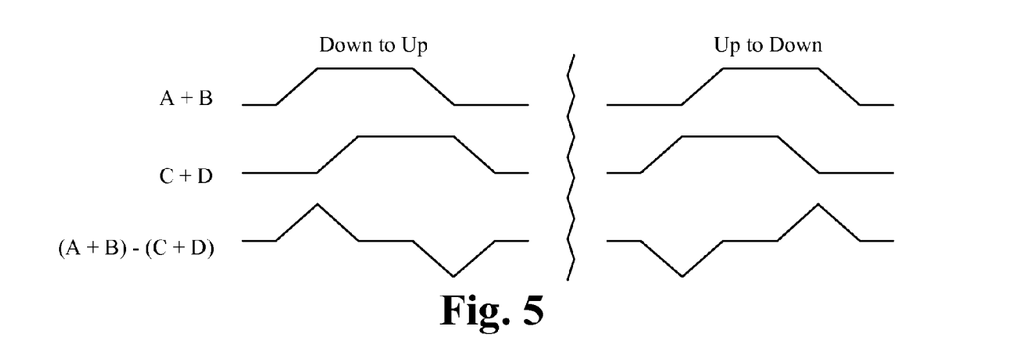

FIGS. 4 and 5 illustrate exemplary composite signals generated from signals output from the segmented photo sensor 12 in response to a target moving in various directions. A composite signal is a composite of two or more segment signals, each segment signal provides sensed voltage versus time data. The composite signals and method of analyzing the composite signals shown in FIGS. 4 and 5 show one exemplary method of how to analyze the segment signals for determining target motion. It is understood that alternative methods of analysis can be applied to the segment signals to determine relative target motion.

Referring to FIG. 4, to determine if a target is moving from right to left or from left to right, the segment signals from segment A and segment C are added together to form composite signal A+C, and the segment signals from segment B and segment D are added together to form composite signal B+D. FIG. 4 illustrates exemplary composite signals corresponding to the determination of right to left or left to right motion of the target. The composite signal B+D is subtracted from the composite signal A+C to form a differential composite signal (A+C)−(B+D). If right to left motion is present, the differential composite signal (A+C)−(B+D) has a positive peak followed by a negative peak, as shown in the bottom left curve of FIG. 4. If left to right motion is present, the differential composite signal (A+C)−(B+D) has a negative peak followed by a positive peak, as shown in the bottom right curve of FIG. 4.

Notice in FIG. 3, that the direction of motion of the target is opposite that of the direction of motion of the image on the segmented photo sensor 12. Image inversion is a result of the optical lens structure 13. In alternative embodiments, described in detail below, the optical lens structure is replaced by one of a number of mechanical structures. In some embodiments of these alternative configurations, the image on the segmented photo sensor 12 moves in the same direction as the target, and the composite signals (A+C) and (B+D) shown in FIG. 4 are swapped and the differential composite signal (A+C)−(B+D) is inverted. As shown in FIG. 3, when the target moves from right to left, the image on the segmented photo sensor 12 moves from left to right. As applied to FIG. 4, when the target moves from right to left, then the image initially appears on segments A and C as the target is on the right, but the image does not yet appear on segments B and D, and the resulting composite signal A+C starts to increase, as shown in the top left curve of FIG. 4, but the composite signal B+D remains at zero. As the target moves to the left, the image starts to appear on segment B+D while still appearing on segments A+C, and the resulting composite signal B+D starts to increase, as shown in the middle left curve of FIG. 4. Eventually, the image fully appears on all segments A-D. When the trailing edge of the target image moves off of segments A and C, the composite signal A+C returns to zero, and the negative peak of the differential composite signal (A+C)−(B+D) is formed.

Similarly, when the target moves from left to right, then the image initially appears on segments B and D as the target is on the left, but the image does not yet appear on segments A and C, and the resulting composite signal B+D starts to increase, as shown in the top right curve of FIG. 4, but the composite signal A+C remains at zero. As the target moves to the right, the image starts to appear on segment A+C while still appearing on segments B+D, and the resulting composite signal A+C starts to increase, as shown in the middle right curve of FIG. 4. Eventually, the image fully appears on all segments A-D. When the trailing edge of the target image moves off of segments B and D, the composite signal B+D returns to zero, and the positive peak of the differential composite signal (A+C)−(B+D) is formed.

Up and down movement is similarly determined To determine if a target is moving from up to down or from down to up, the segment signals from segment A and segment B are added together to form composite signal A+B, and the segment signals from segment C and segment D are added together to form composite signal C+D. FIG. 5 illustrates exemplary composite signals corresponding to the determination of up to down or down to up motion of the target. The composite signal C+D is subtracted from the composite signal A+B to form a differential composite signal (A+B)−(C+D). If down to up motion is present, the differential composite signal (A+B)−(C+D) has a positive peak followed by a negative peak, as shown in the bottom left curve of FIG. 5. If up to down motion is present, the differential composite signal (A+B)−(C+D) has a negative peak followed by a positive peak, as shown in the bottom right curve of FIG. 5.

When the target moves from down to up, then the image initially appears on segments A and B, but the image does not yet appear on segments C and D. The resulting composite signal A+B starts to increase, as shown in the top left curve of FIG. 5, but the composite signal C+D remains at zero. As the target moves downward, the image starts to appear on segment C+D while still appearing on segments A+B, and the resulting composite signal C+D starts to increase, as shown in the middle left curve of FIG. 5. Eventually, the image fully appears on all segments A-D. As in the right to left motion, with down to up motion the differential composite signal (A+B)−(C+D) exhibits a positive peak followed by a negative peak, as shown in the bottom left curve of FIG. 5. It can be easily seen that the opposite motion, up to down, forms a similar differential composite signal (A+B)−(C+D), but with the opposite phase, as shown in the bottom right curve of FIG. 5.

Additional processing is performed to determine motion toward and away from the segmented photo sensor, referred to as in and out motion. To determine in and out motion, all four segments A, B, C, D are added to form a composite signal A+B+C+D. If the composite signal A+B+C+D increases over a given time period, then it is determined that there is motion toward the segmented photo sensor, or inward. If the composite signal A+B+C+D decreases over a given time period, then it is determined that there is motion away from the segmented photo sensor, or outward.

In general, the segments are measured and the segment signals are processed as appropriate to determine changes in magnitude of the composite signals. These changes in magnitude, when compared temporally with changes in magnitude of other composite signals, determine relative motion of a target reflecting light back to the segmented photo sensor.

In alternative embodiments, mechanical structures are used in place of the optical lens structure. Mechanical structures are used to influence how the reflected light is directed to the segmented photo sensor. A first mechanical structure is referred to as a sundial configuration. The sundial configuration implements a physical "wall" protruding from a sensor surface of the segmented photo sensor. The wall effectively casts a "shadow" on various sensor segments as the target moves across the space above the segmented photo sensor. This shadow is tracked and target motion is correspondingly determined.

Figure 6:
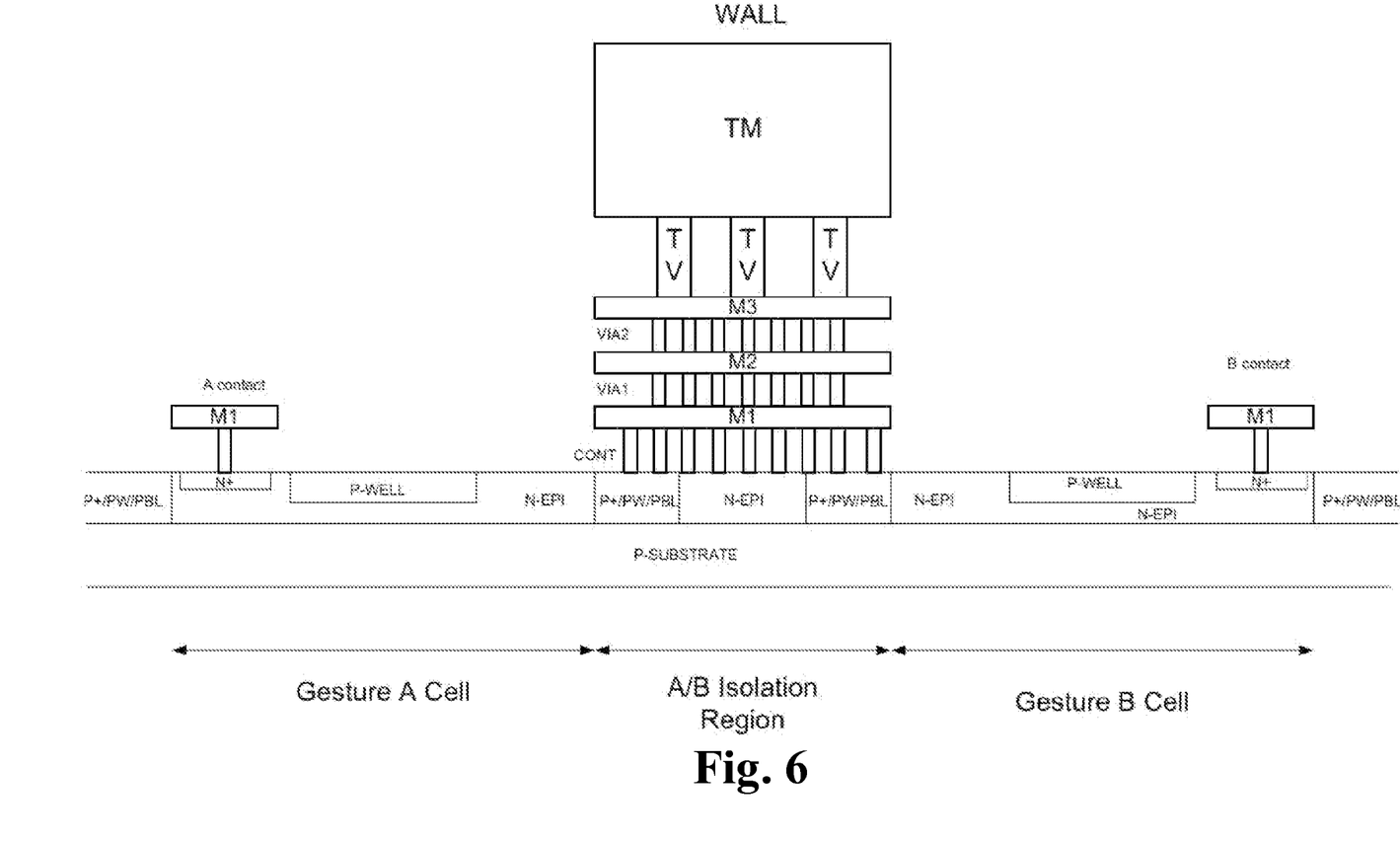
FIG. 6 illustrates a cross section view of a sundial configuration according to an embodiment.

FIG. 6 illustrates a cross section view of a sundial configuration according to an embodiment. The sundial configuration provides a mechanical means for directing reflected light onto a photo sensor, in this case a photodiode. The center structure is the physical sundial wall used to block reflected light. The two N-EPI to P-SUBSTRATE junctions on either side of the wall form two photodiodes. The wall is a series of metal layers built up to separate the two photo diodes. In the exemplary configuration of FIG. 6, the wall includes a first metal layer M1, a second metal layer M2, a third metal layer M3, and a top metal layer TM. Each metal layer is separated by a passivation layer, such as silicon dioxide within which through-vias are formed. The metal layers, passivation layers, and through-vias are formed using conventional semiconductor processing techniques. The wall is formed on a substrate doped to form the photodiodes, also referred to as a cell. The first photodiode, or photodiode cell A, is formed by an N-EPI to P-SUBSTRATE junction. A metal contact M1 is coupled to the N-EPI region in order to make contact to the photodiode cell A cathode. The P-SUBSTRATE serves as the photodiode anode, and it is common for both the photodiode cells A and B cells. There is an additional photodiode formed by adding a P-WELL layer on top of the N-EPI layer of photodiode cell A. A contact for the P-well is made at the end of the P-well, not shown in FIG. 6. In some embodiments, the P-well photodiode is used to measure ambient light when the gesture function is not used. Such a configuration and functionality is described in the co-owned U.S. patent application Ser. No. 12/889,335, filed on Sep. 23, 2010, and entitled "Double Layer Photodiodes in Ambient Light Sensors and Proximity Detectors", which is hereby incorporated in its entirety by reference. The second photodiode, or photodiode cell B, is formed in a manner identical to the photodiode A cell. The two photodiode cells A and B are isolated by two P+ diffusions that extend through the N-EPI region and contact the P-SUBSTRATE. An island of N-EPI is formed between the two P+ isolation diffusions. This island forms an additional diode that collects any stray photocurrent that might migrate from under photodiode cell A and otherwise be collected by photodiode cell B. The additional diode also collects any stray photocurrent that might migrate from under photodiode cell B and be otherwise collected by photodiode cell A. Together, the two P+ isolation diffusions and the N-EPI island in between them form the A/B isolation region. The three elements of the A/B isolation region are all shorted by the first metal layer M1, which is connected to ground at the top metal layer TM. Any photocurrent collected in the composite A/B isolation region is shunted to ground, reducing crosstalk between photodiode cell A and photodiode cell B.

Figure 7:
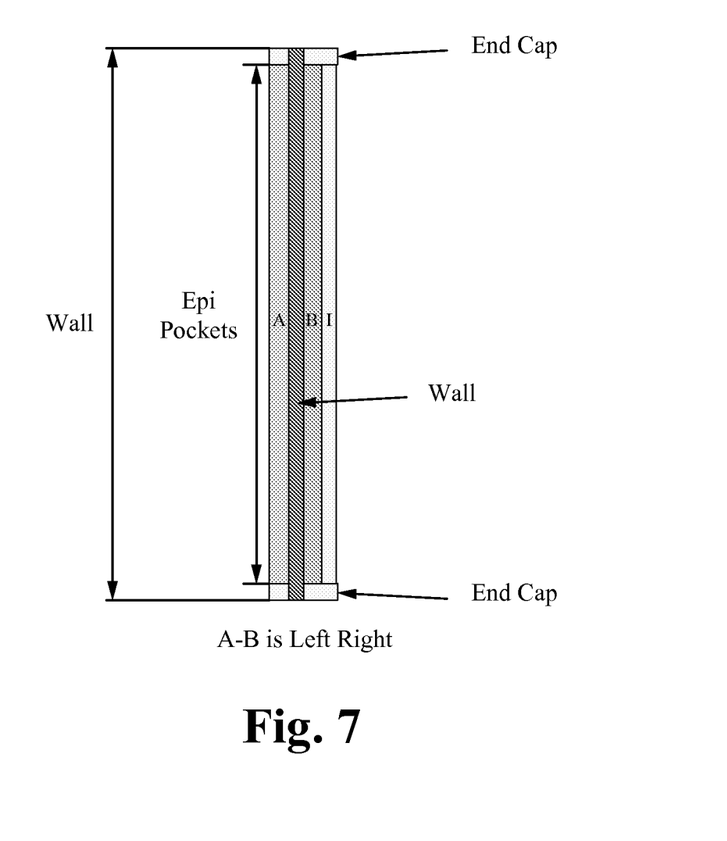
FIG. 7 illustrates a top down view of the cell of FIG. 6.
Figure 8:
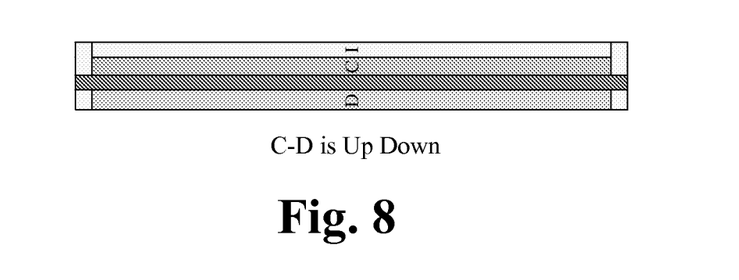
FIG. 8 illustrates the cell of FIG. 7 rotated by 90 degrees.
Figure 9:
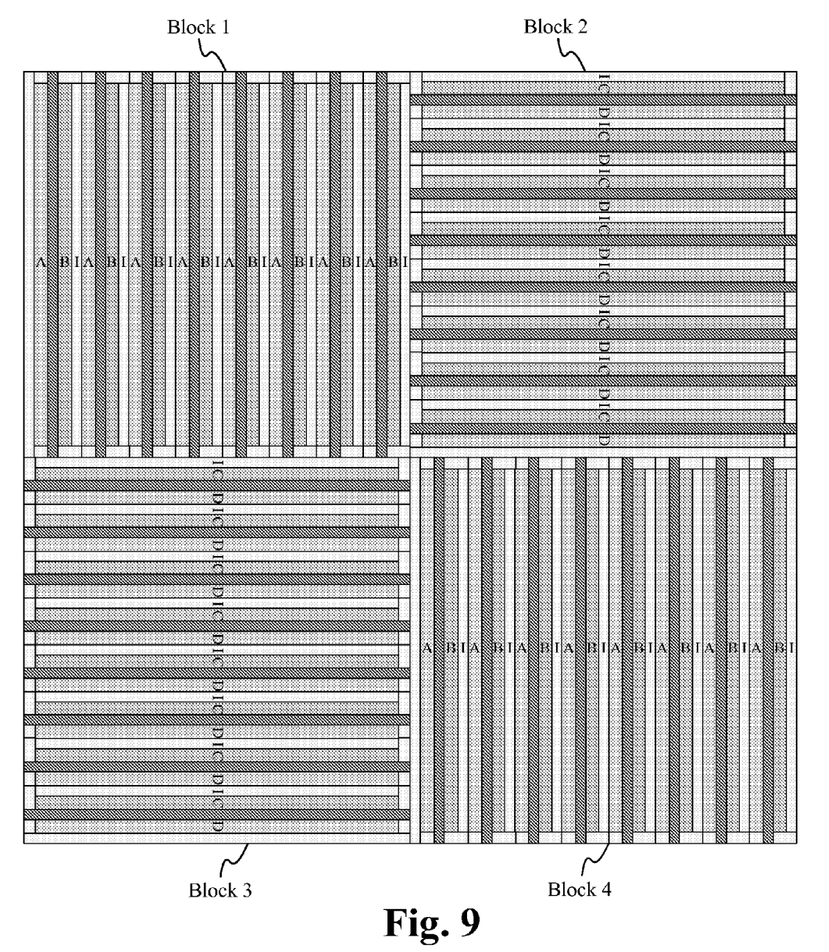
FIG. 9 illustrates a top down view of a plurality of cells configured to form four segments.

The structure in FIG. 6 is a cell that includes photodiode cell A, photodiode cell B, the isolation region, and the wall. FIG. 7 illustrates a top down view of the cell of FIG. 6. This cell is configured to determine left-right motion as the wall is aligned perpendicularly to the direction of motion, left-right, to be determined. To determine up-down motion, the cell is rotated 90 degrees, as shown in FIG. 8. In the cell configuration of FIG. 8, the wall structure is aligned perpendicularly to the up-down motion to be determined. A reason for creating cells is that the size of the photodiode cells is restricted, specifically the width of the photodiode cell extending away from the wall structure. This limits the surface area that can be used to measure the reflected light. FIG. 9 illustrates a top down view of a plurality of cells configured to form four blocks according to an embodiment. Each cell is isolated from an adjacent cell by an isolation region I. In FIG. 9, block 1 is made of an array of alternating photodiode cells A and B. Block 1 is identical to block 4 which also include an array of alternating photodiode cells A and B. All of the photodiode cells A in both blocks 1 and 4 are shorted together to form an aggregated A node. Aggregating the array of cells increases signal strength. Likewise, all of the photodiode cells B in both blocks 1 and 4 are aggregated together to form a single B node. The same connection scheme is used to form a C node and a D node from the array of alternating photodiode cells C and D in blocks 2 and 3. The photodiode cells in blocks 2 and 3 are rotated 90 degrees relative to the photodiode cells in blocks 1 and 4. In this manner, there are four distinct signals, one from each of nodes A, B, C, and D.

Target motion in the left-right and up-down directions is again determined by analyzing differential signals. To determine target motion in the left-right direction, the differential signal A−B is formed. The differential signal A−B is analyzed in a similar manner as the differential composite signal (A+C)−(B+D) related to the quad cell configuration of FIG. 3. To determine target motion in the up-down direction, the differential signal C−D is formed. The differential signal C−D is analyzed in a similar manner as the differential composite signal (A+B)−(C+D) related to the quad cell configuration of FIG. 3.

Figure 10:
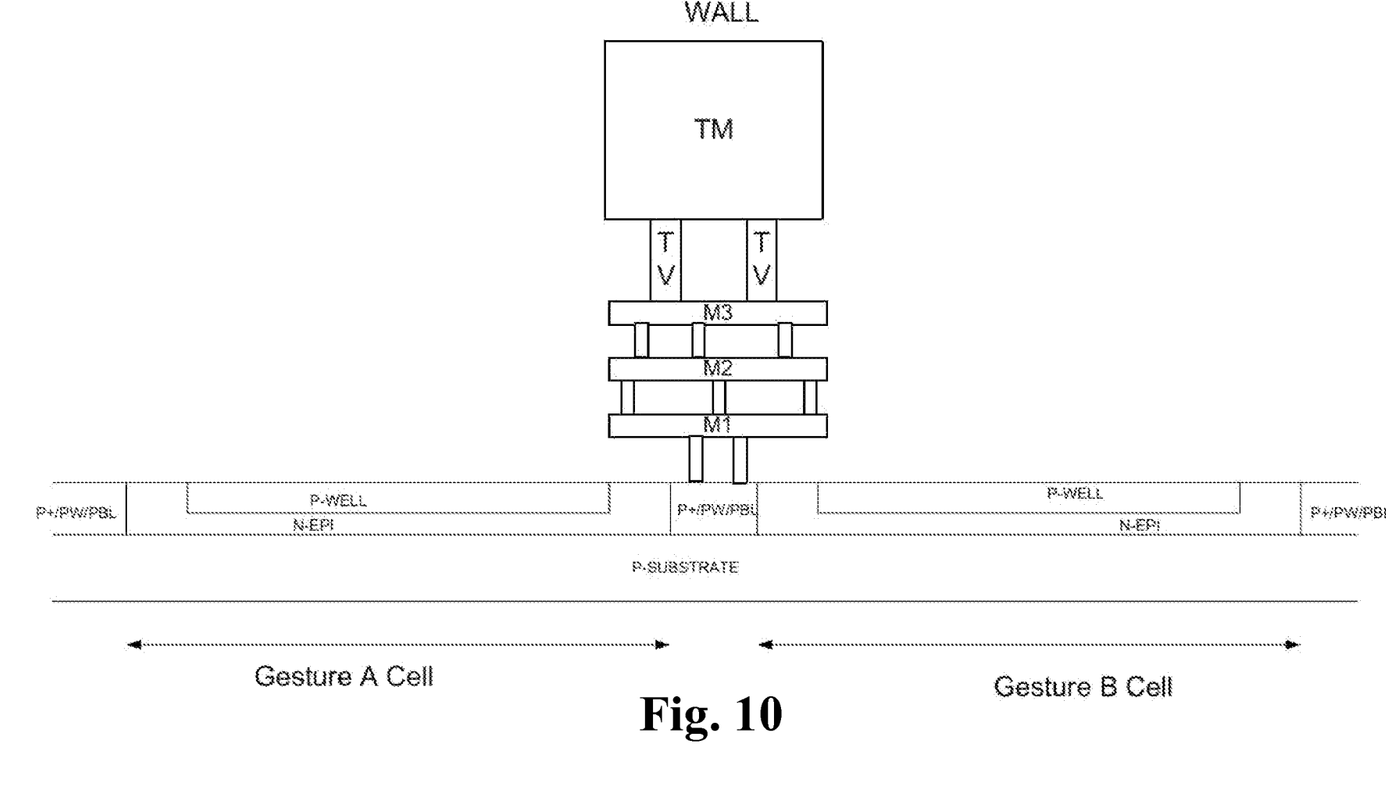
FIG. 10 illustrates a cross section view of a sundial configuration according to an alternative embodiment.

The cell structure shown in FIG. 6 is an exemplary sundial configuration and alternative structures are also contemplated. FIG. 10 illustrates a cross section view of a sundial configuration according to an alternative embodiment. In the alternative configuration of FIG. 10, the wall is alternatively formed, and the underlying substrate is alternatively doped. In this embodiment, the isolation region between the two photodiode cells A and B consists of a single P+ diffusion. The smaller isolation region of FIG. 10 compared to that of FIG. 6 allows for increased packing density. P-WELL and N-EPI region contacts are made at the end of the array, not shown in FIG. 10. The P+ region in the substrate is connected to ground at the top metal layer TM.

Figure 11:
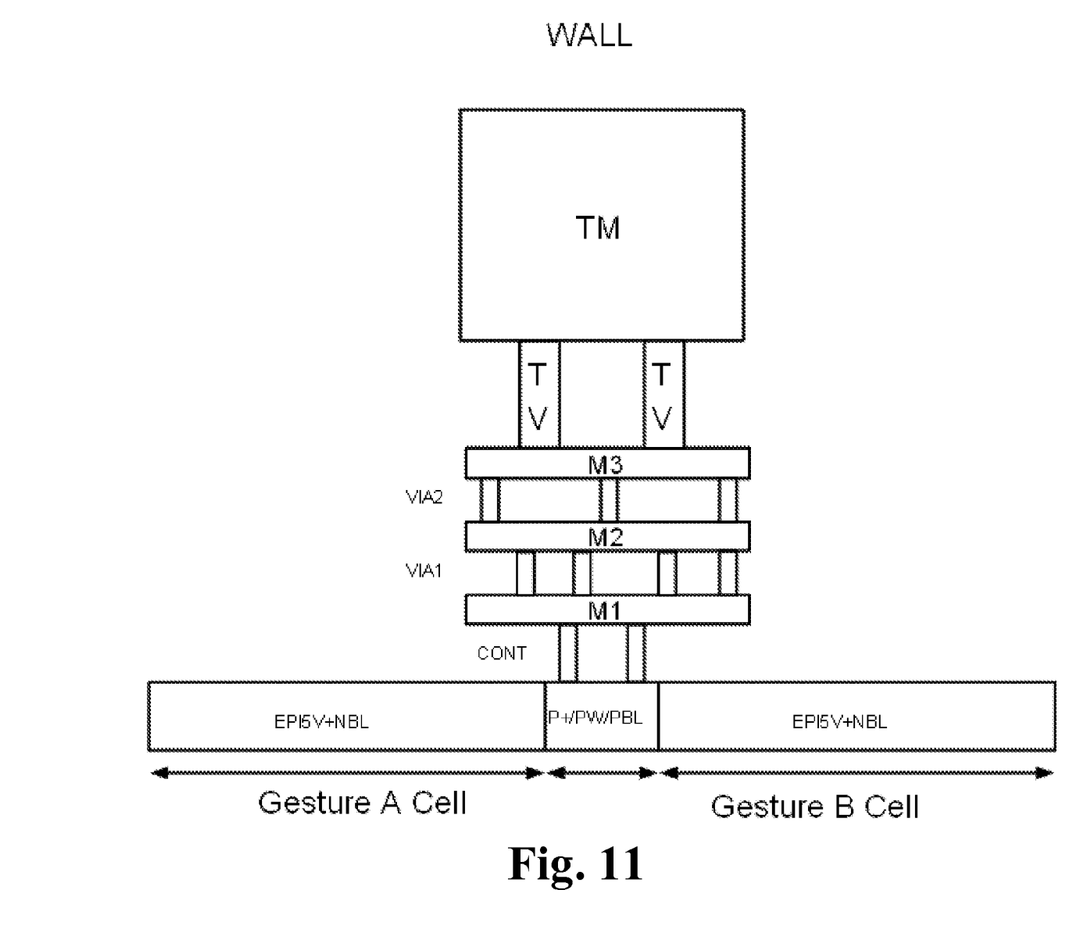
FIG. 11 illustrates a cross section view of a sundial configuration according to yet another alternative embodiment.

FIG. 11 illustrates a cross section view of a sundial configuration according to yet another alternative embodiment. In the alternative configuration of FIG. 11, the wall is alternatively formed, and the underlying substrate is alternatively doped. The photodiode cells do not include a P-WELL in this configuration. The N-EPI region contacts are made at the end of the array, not shown in FIG. 11. The P+ isolation region between the photodiode cells A and B is connected to ground at the top metal layer TM. In this embodiment, the absence of the P-WELL layer permits the fabrication of narrower photodiode cells A and B compared to that of FIG. 6. This structure affords higher cell packing density compared to that of FIG. 6.

Figure 12:
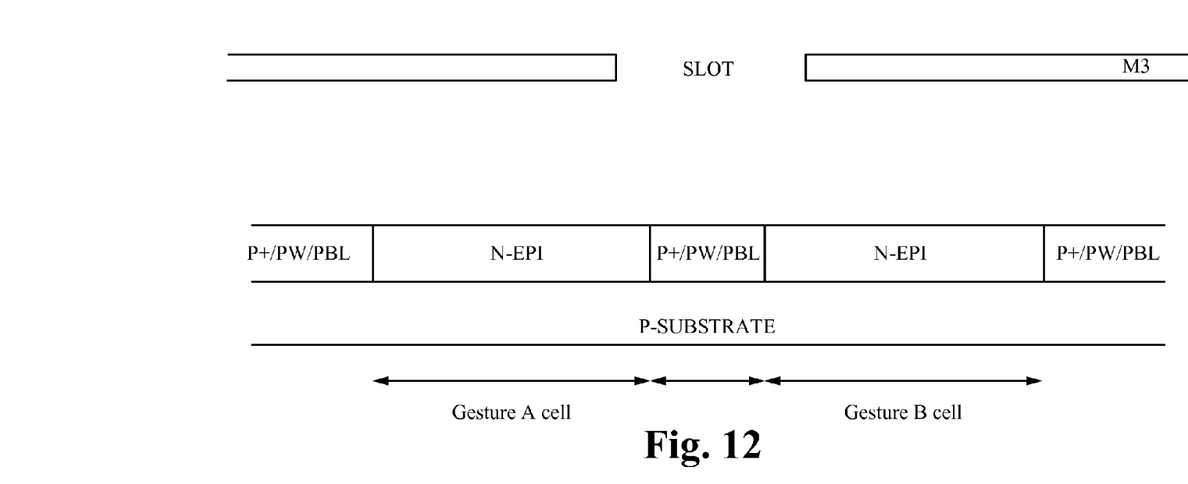
FIG. 12 illustrates a cross section view of a pinhole configuration according to an embodiment.
Figure 13:
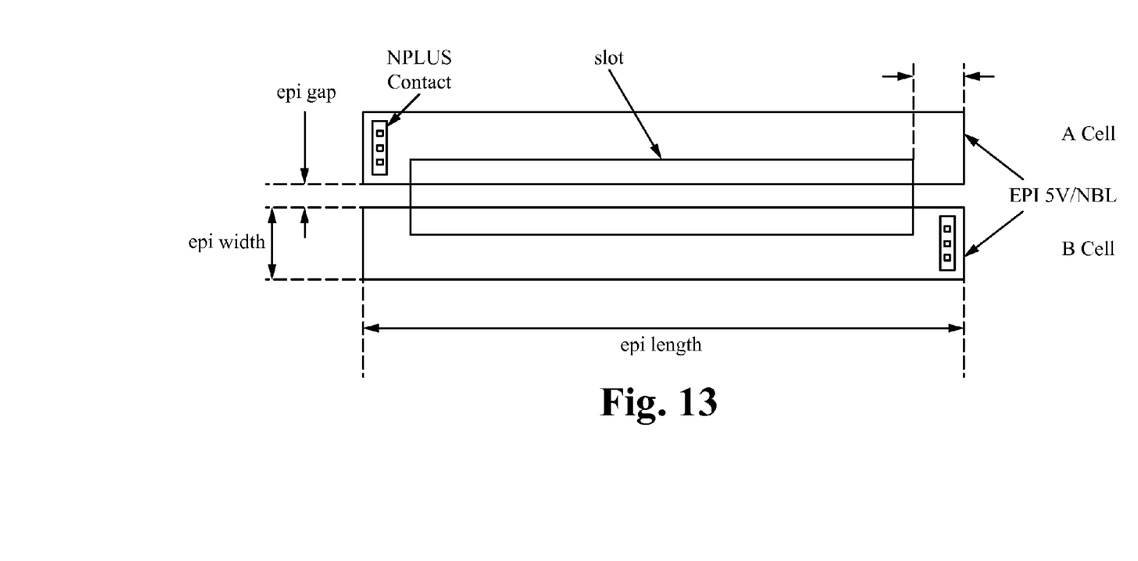
FIG. 13 illustrates a top down plan view of the cell of FIG. 12.

A second mechanical structure is referred to as a pinstripe configuration. FIG. 12 illustrates a cross section view of a pinstripe configuration according to an embodiment. The pinstripe configuration provides a mechanical means for directing reflected light onto a photo sensor, in this case a photodiode. The pinstripe configuration is analogous to a pinhole camera, where the pinhole has been elongated into a stripe or slot. The two N-EPI sections in the substrate form the cathodes of photodiode cells A and B, with the P-SUBSTRATE forming the common anode. A metal layer M3 is formed over the cell, and an open slot is formed in the metal layer. The metal layer is formed over an interlayer dielectric, such as silicon dioxide, which is optically transparent. The metal layer and open slot are formed using conventional semiconductor manufacturing processes. In some embodiments, the cell structure is formed using conventional CMOS, digital semiconductor manufacturing processes. FIG. 13 illustrates a top down plan view of the cell of FIG. 12. As shown in FIG. 13, the open slot is aligned along a length of the cell. The open slot can run the entire length or partial length of the cell.

In operation, reflected light passes through the open slot and impinges the photodiodes, N-EPI sections. When a target position is on the right side of the open slot, light reflected from the target passes through the open slot and impinges the left side photodiode cell A. As the target moves from right to left, more reflected light impinges the left side photodiode cell A until the target passes a critical angle where less reflected light impinges the left photodiode cell A and instead, reflected light begins to impinge the right side photodiode cell B. When the target is directly overhead the slot, at a crossover point, the signals received from the photodiode cells A and B are the same. This is the position of highest overall signal strength, and is also where the difference between the two signals, A−B, is zero. As the target continues moving to the left, more reflected light impinges the right side photodiode cell B, and the difference signal, A−B, changes sign and becomes negative. After further leftward motion of the target, zero reflected light impinges the left side photodiode cell A. Similarly to the sundial configurations, a plurality of cells of the pinhole configuration are adjacently positioned to form a block, and the signals from the individual photodiode cells A are aggregated together to form the common A node. The same type of signal aggregation is used for the B through D signals. The alignment of the open slot determines the direction of target motion to be determined For example, the horizontal alignment of the open slot in FIG. 13 is used to determine up-down motion. A plurality of cells aligned such as the cell in FIG. 13 form a segment configured to measure up-down motion. Vertical alignment of the open slot is used to determine left-right motion. In an exemplary configuration, the segments having the pinstripe configuration are aligned in a similar manner as those segments having the sundial configuration as shown in FIG. 9 where segments A and D are configured to determine left-right motion and segments B and C are configured to determine up-down motion. Target motion in the left-right and up-down directions is determined using the differential signals in the same manner as the sundial configuration described above.

In alternative configurations, the metal layer and open slot can be replaced by any type of light obscuring element that enables light to enter through a defined area and block light elsewhere, such as a MEMS (micro-electro-mechanical systems) device or other levered, or partially floating element, where the obscuring element is supported by an optically transparent material or suspended over air proximate the open slot. A MEMS device is a very small mechanical device driven by electricity.

Figure 19:
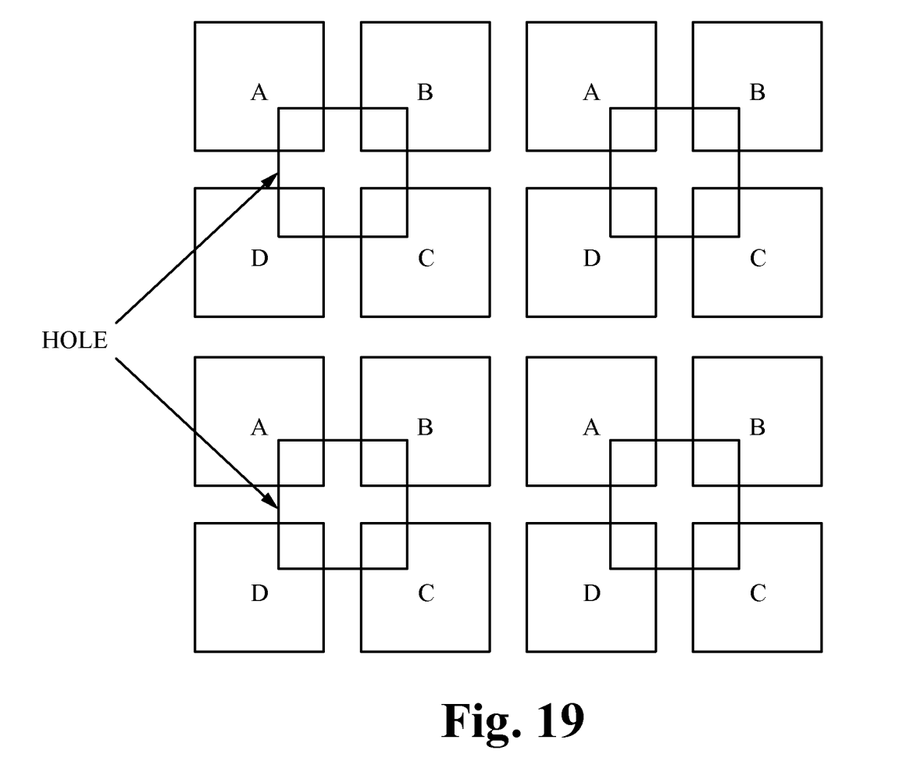
FIG. 19 illustrates a top down view of a micro quad cell configuration according to an embodiment.

An alternate embodiment is the application of the pinstripe concept to the quad cell design to produce a micro quad cell. FIG. 19 illustrates a top down view of a micro quad cell configuration according to an embodiment. The micro quad cell consists of an array of small quad cells. All of the individual A segments are aggregated together to form a single A signal, and likewise so are the B, C, and D segments. The array of quad cells is covered by a metal layer that has square or round openings that let light through. The metal layer is formed in a manner similar to that described for the pinstripe concept, using a semiconductor process. The dimensions of the quad cells A through D, the metal layer spacing, and the dimension of the opening in the metal layer are consistent with the dimensions typically available in semiconductor processes. The openings in the metal layer are positioned so that when light is directly overhead the opening, all cells are equally, but partially illuminated. When the angle of the light changes, the relative illumination of the four cells becomes imbalanced. The four signals, A through D, are processed in a manner identical to that described previously for FIG. 3.

Figure 14:
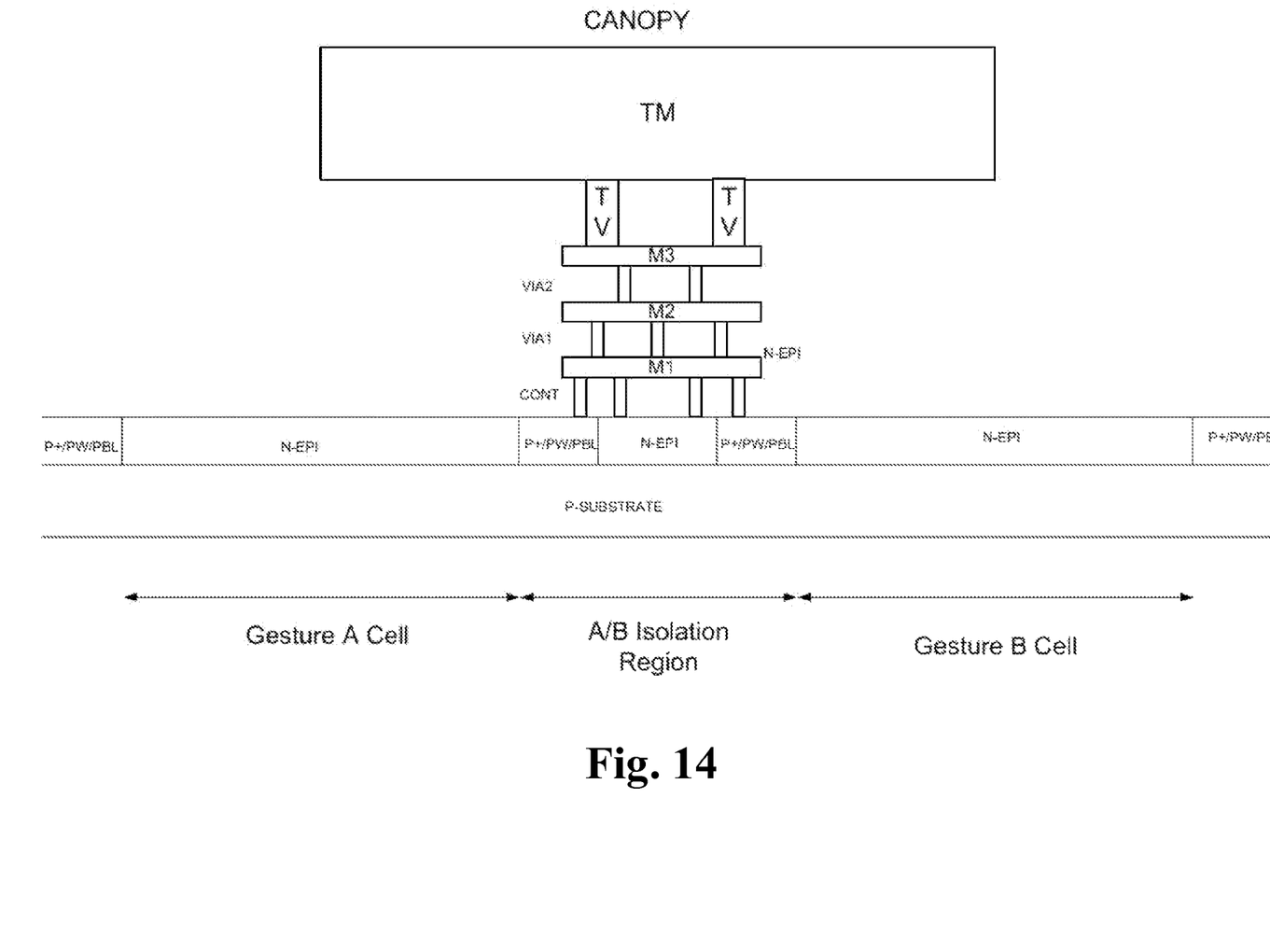
FIG. 14 illustrates a cross section view of a canopy configuration according to an embodiment.

A third mechanical structure is referred to as a canopy configuration. The canopy configuration operates similarly as the pinstripe configuration except that instead of reflected light accessing the photodiodes of a cell through an open slot in the center of the cell structure, as in the pinhole configuration, the center of the cell structure is covered by a "canopy" and the peripheral sides of the structure are open to allow reflected light to access the photodiodes of the cell. FIG. 14 illustrates a cross section view of a canopy configuration according to an embodiment. The canopy configuration provides a mechanical means for directing reflected light onto a photo sensor, in this case a photodiode. The two N-EPI sections form photodiode cells A and B. A top metal layer TM forms a canopy over the center of the cell structure, thereby covering an inner portion of the photodiodes but not covering an outer portion. The top metal layer is a top layer of a wall formed as a series of metal layers built that separate the two photodiode cells A and B. The wall structure is formed in a similar manner as the wall structures of the sundial configurations, except that the top metal layer TM of the canopy configuration extends over portions of the two photodiode cells A and B. The portion of the top metal layer TM that extends over the two photodiodes cells A and B is formed over an interlayer dielectric (not shown), such as silicon dioxide, which is optically transparent. Similarly to the pinstripe configuration and sundial configurations, a plurality of cells of the canopy configuration are adjacently positioned to form a segment, and multiple segments are configured and oriented to determine left-right and up-down motion. Reflected light is sensed by the photodiode cells A and B, and the sensed voltage is collected and processed similarly as for the pinstripe configuration and sundial configuration described above.

Figure 15:
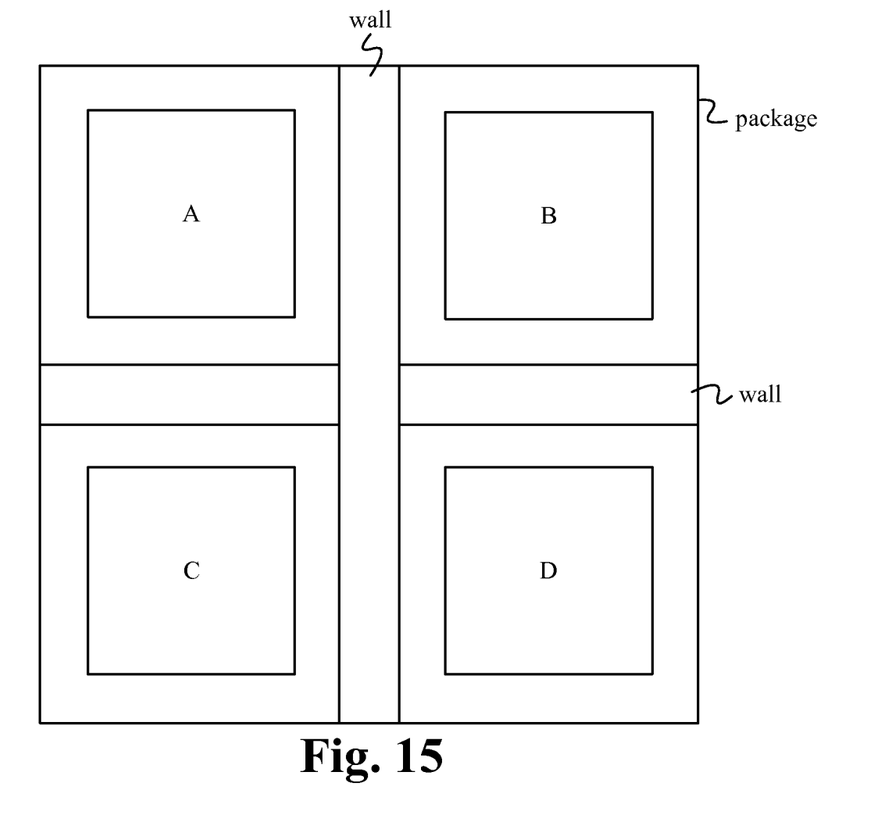
FIG. 15 illustrates a top down view of a corner quad configuration according to an embodiment.
Figure 16:
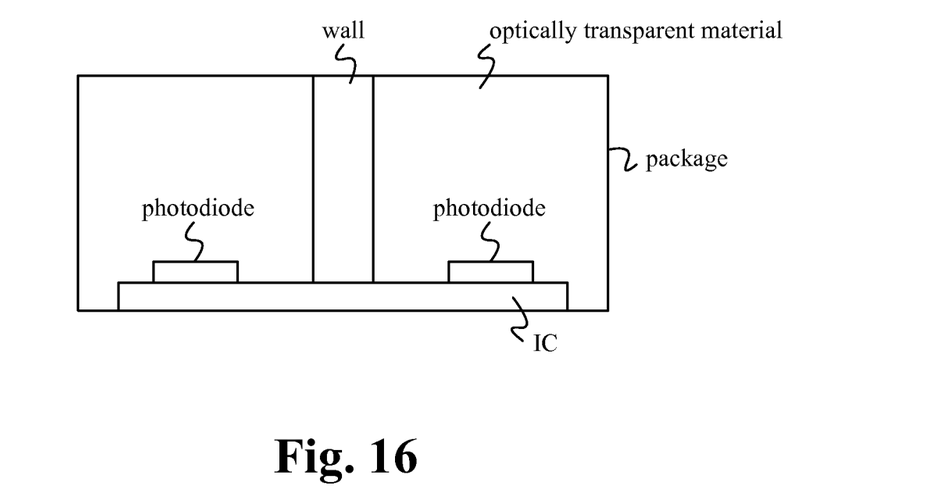
FIG. 16 illustrates a cross section view of the corner quad configuration of FIG. 15.

A fourth mechanical structure is referred to as a corner quad configuration. The corner quad configuration is similar conceptually to the sundial configuration in the use of a physical wall positioned between photo sensing elements, but instead of implementing the wall at the silicon level and having a plurality of cells for each segment, as in the sundial configuration, the corner quad configuration is implemented at the chip package level where a wall is formed between the segments. FIG. 15 illustrates a top down view of a corner quad configuration according to an embodiment. FIG. 16 illustrates a cross section view of the corner quad configuration of FIG. 15. In the exemplary configuration shown in FIGS. 15 and 16, photo sensor segments A-D are formed as four photodiodes on an integrated circuit chip. The four photodiodes can be considered as identical to the four photodiodes of FIG. 3, except that instead of using the closely spaced quad geometry of FIG. 3, the photodiodes are instead spaced apart and placed in the four corners of the substrate. The integrated circuit chip is packaged in a chip package that includes a wall made of optically opaque material that blocks light, such as the light reflected from a moving target. The portion of the chip package above the photodiodes is made of an optically transparent material. The height of the wall in the corner quad configuration is high enough so that each segment is a single sensor element, as opposed to a plurality of cells as in the sundial and canopy configurations. Determination of the target motion is determined in a similar manner as the sundial configuration without having to aggregate the individual cell voltages for a given segment. The corner quad configuration includes a wall that has a chip package level of magnitude versus the sundial configuration that includes a wall that has a transistor level of magnitude.

Figure 17:
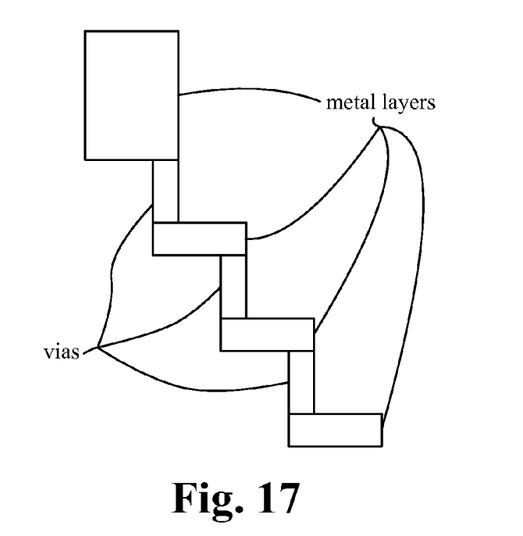
FIG. 17 illustrates an exemplary implementation of the angled walls used in the Venetian blinds configuration.
Figure 18:
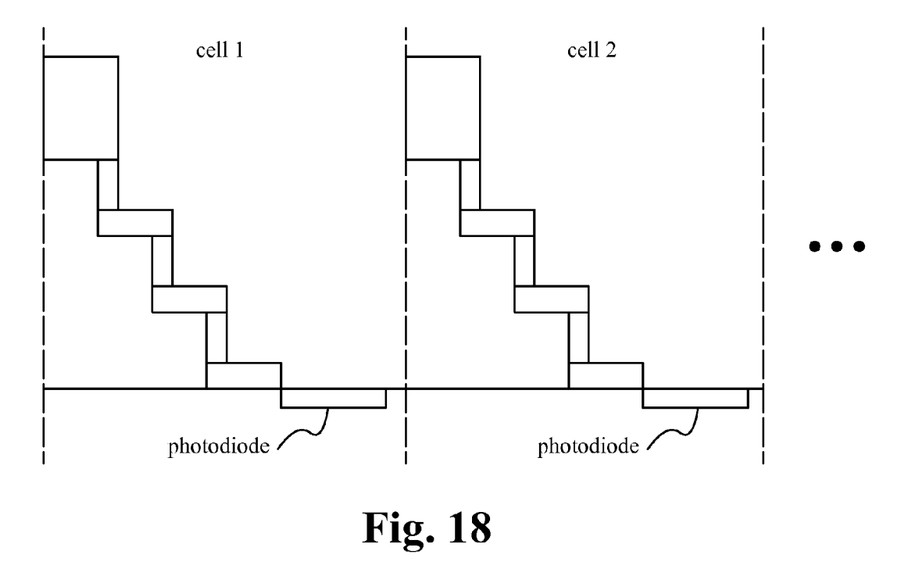
FIG. 18 illustrates adjacent cells in the Venetian blinds configuration.

A fifth mechanical structure is referred to as a Venetian blinds configuration. The Venetian blinds configuration is similar to the sundial configuration except that the wall structure in each cell is formed at a non-perpendicular angle to the photodiode cell(s), as opposed to the perpendicular angle as in the sundial configuration. The angled walls are fabricated by forming metal layers and through-vias in a stair step configuration, as shown in FIG. 17. Additionally, each cell in the Venetian blind configuration includes a single photodiode cell positioned on one side of the angled wall, as shown in FIG. 18. In the Venetian blind configuration, each of the four segments is facing a different 90 degree direction. For example, segment A is configured with the walls angled to the left, segment B is configured with the walls angled upward, segment C is configured with the walls angled downward, and segment D is configured with the walls angled to the right. In other words, each segment has a different field of view. Using these alignments, target motion in the left-right and up-down directions is determined using the differential signals in the same manner as the sundial configuration described above. It is understood that alternative alignments can be used.

In some embodiments, filters are added on top of the photo sensors to filter out light having wavelengths that are different than the illumination source.

The exemplary embodiments describe a gesture sensing device having four symmetrically configured segments, or photo sensors. It is understood that the concepts described herein can be extended to more than four segments configured symmetrically or asymmetrically, as in an N×N, N×M, circular, or other shaped array of photo segments or sensors.

The gesture sensing device has been described in terms of specific embodiments incorporating details to facilitate the understanding of the principles of construction and operation of the gesture sensing device. Such references, herein, to specific embodiments and details thereof are not intended to limit the scope of the claims appended hereto. It will be apparent to those skilled in the art that modifications can be made in the embodiments chosen for illustration without departing from the spirit and scope of the gesture sensing device.

What is claimed:
1. A device to determine a physical gesture, the device comprising:
    a single illumination source configured to emit light;
    a plurality of light sensors configured to detect the light reflected from an object and to output time dependent signals in response thereto;
    a processing circuit coupled to the plurality of light sensors to analyze the time dependent signals received from the plurality of light sensors and to determine target object directional movement proximate to the plurality of light sensors; and a light modifying wall structure disposed adjacent to the light sensor assembly, the light modifying wall structure configured to selectively block a portion of the light reflected from the object depending on a position of the object relative to the light sensor assembly, the light modifying wall structure comprising a plurality of layers and a plurality of vias, respective ones of the plurality of layers and the plurality of vias offset in a stair-step fashion with respect to a center axis defined perpendicular to a surface of the light sensor assembly.

2. The device of claim 1 wherein the illumination source comprises a light emitting diode.

3. The device of claim 2 wherein the light emitting diode comprises a single light emitting diode.

4. The device of claim 1 wherein each light sensor comprises a photodiode.

5. The device of claim 1 wherein the plurality of light sensors comprises an array of individual light sensors.

6. The device of claim 1 wherein the plurality of light sensors comprises a single light sensor partitioned into multiple segments.

7. The device of claim 1, wherein the plurality of light sensors are formed on an integrated circuit chip and each light sensor is a photodiode, wherein the light modifying wall structure is coupled to the integrated circuit chip.

8. A device to determine a physical gesture, the device comprising:
a single illumination source configured to emit light;
a light sensor assembly configured to detect the light reflected from an object and to output time dependent signals in response thereto;
a processing circuit coupled to the light sensor assembly and configured to analyze the time dependent signals received from the light sensor assembly and to determine object directional movement proximate to the at least one light sensor; and
a light modifying wall structure disposed generally adjacent to a surface of the light sensor assembly, the light modifying wall structure configured to selectively block a portion of the light reflected from the object depending on a position of the object relative to the light sensor assembly, the light modifying wall structure comprising a plurality of layers extending generally upwardly with respect to a surface of the light sensor assembly, respective ones of the plurality of layers horizontally offset with respect to an underlying layer in a direction extending from a vertical axis defined with respect to the surface.

9. The device of claim 8 wherein the illumination source comprises a light emitting diode.

10. The device of claim 8 wherein each light sensor comprises a photodiode.

11. The device of claim 8 wherein the plurality of light sensors comprises an array of individual light sensors.

12. The device of claim 8 wherein the plurality of light sensors comprises a single light sensor partitioned into multiple segments.

13. A sensing device comprising:
a single illumination source configured to emit a light;
a light sensor assembly having a processing circuit and configured to detect the light reflected from an object proximate to the sensing device and to analyze the light reflected to determine directional movement of the object; and
a light modifying wall structure disposed generally adjacent to an edge of the light sensor assembly, the light modifying wall structure configured to selectively block a portion of the light reflected from the object depending on a position of the object relative to the light sensor assembly, the light modifying wall structure comprising a plurality of metal layers and a plurality of through-vias, respective ones of the plurality of metal layers horizontally offset with respect to an underlying layer in a direction extending from a vertical axis defined with respect to the surface.

* * * * *